UNITED STATES PATENT OFFICE.

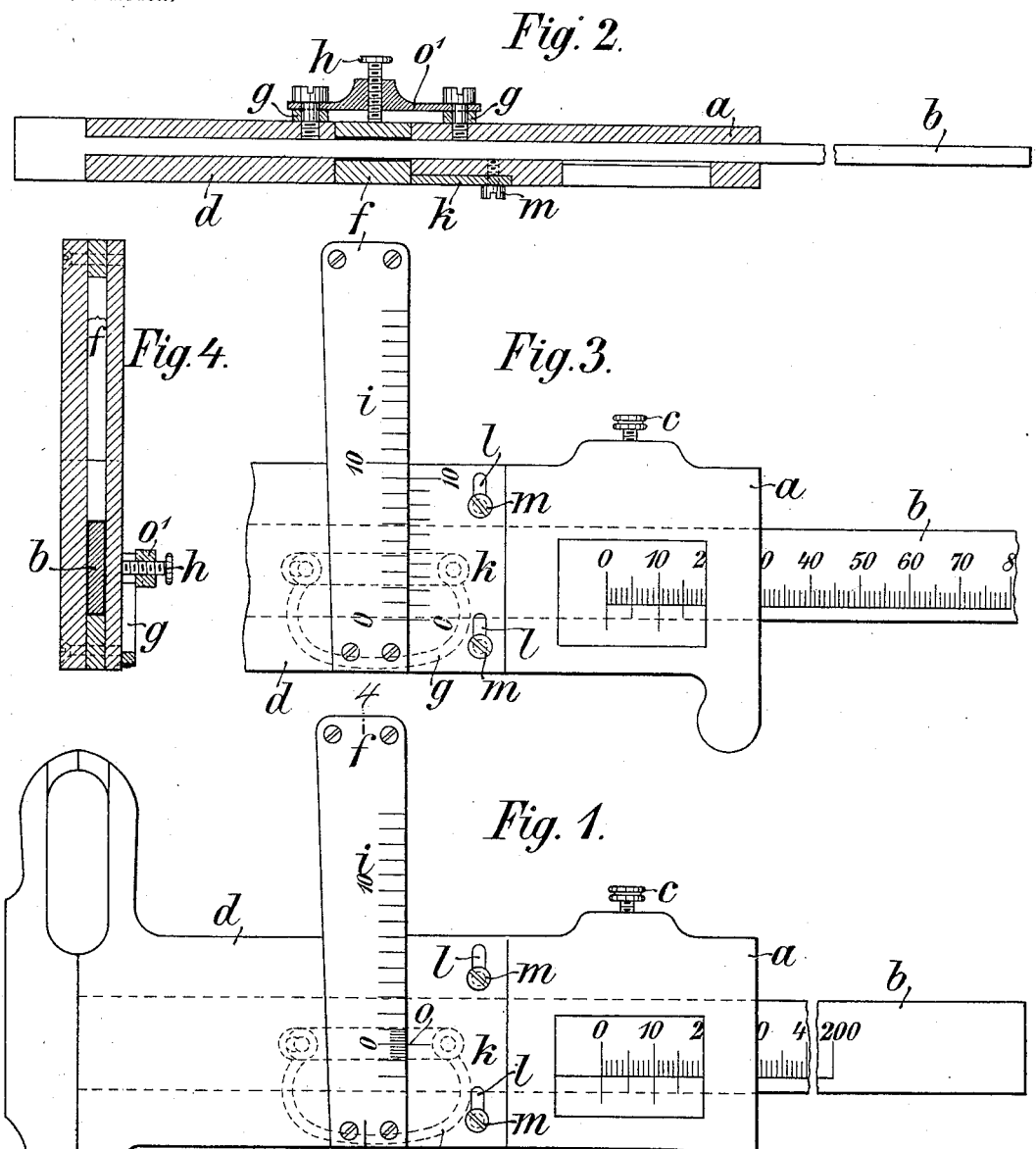

HERMANN KIENAST, OF BERLIN, GERMANY.

MEASURING DEVICE.

SPECIFICATION forming part of Letters Patent No. 613,684, dated November 8, 1898.

Application filed February 4, 1898. Serial No. 669,096. (No model.)

*To all whom it may concern:*

Be it known that I, HERMANN KIENAST, a subject of the King of Prussia, German Emperor, and a resident of Berlin, in the Kingdom of Prussia and German Empire, have invented a certain new and useful Improvement in Measuring Devices, of which the following is a specification.

This invention relates to measuring devices, such as calipers, caliper-squares, gages, measuring-machines, and other similar devices of this class.

In the measuring devices as heretofore generally constructed the adjustment of the measuring-slide is effected either by moving the latter by hand or by means of a micrometer-screw. In the former case the accuracy obtainable is naturally limited or it becomes necessary to resort to the use of a magnifying-glass. The adjustment by hand is inaccurate and there is no possibility of compensating for wear of the operating-surfaces. On the other hand, while it is true that in measuring devices provided with micrometer-screws an accurate adjustment is attainable these measuring devices present other objections. In the first place micrometer-screws are difficult to make accurately. Moreover, they are rather subject to wear, and the latter is difficult to compensate for. Another objection is this, that measuring devices of this kind are rather too delicate to be intrusted to the use of any but skilled workmen, and they require some practice on the part of the user.

The object of my present invention is to provide improved means for removing these objections in measuring devices of the kind referred to.

My invention therefore consists in the novel arrangement and combination of parts more fully hereinafter described, and shown in the accompanying drawings. According to this novel arrangement and combination the more minute adjustment of the measuring-slide is effected by means of a conical or wedge-shaped part arranged between the adjusting-slide and the measuring-slide and adapted when moved relatively to the latter to impart movement to the same. The extent of movement of the said conical or wedge-shaped part, hereinafter to be called the "wedge," may be read off by means of a graduation provided either on the said wedge or on the adjusting-slide and by means of a mark or a nonius or vernier. By this arrangement a very considerable degree of accuracy is attainable with easy and simple handling, so that the measuring device may be used even by unskilled workmen. Supposing, for instance, that the wedge have a pitch of one in thirty millimeters and that the graduation of thirty millimeters length be given ten division-lines, then a movement of the wedge to the extent of one division-line will correspond with a movement of the measuring-slide of one-tenth millimeter. Now since the distance between the division-lines is three millimeters the intermediate space may easily be subdivided into five parts, so that by shifting the wedge to the extent of one such subdivision a correct measurement of one-fiftieth millimeter may be obtained, and since movements to the extent of one-half the distance between two such subdivision-lines may be read off with the naked eye an accuracy of one one-hundredth millimeter is obtained. The wedge is simply moved by hand, preferably with the thumb of the hand which holds the measuring device, so that the other hand is not required at all, as would be the case in adjustments effected by means of a micrometer. Thus a perfect adjustment may be rapidly made by means of my improvement. Since the wedge may be given any desired pitch, any requisite degree of accuracy may easily be attained.

In the accompanying drawings, which illustrate the invention by way of example, Figure 1 is an under side view, as seen from below in Fig. 2, of a caliper provided with my improvement, a part of the graduated beam being broken away. Fig. 2 is a longitudinal section. Fig. 3 is an elevation of a detail, showing a modification. Fig. 4 is a section on the line 4 4, Fig. 1, to show how the wedge straddles the graduated bar or beam.

In the calipers shown in Figs. 1 and 2 *a* is the usual adjusting-slide adapted to be moved along the graduated beam *b* and to be secured in any position of adjustment thereon by means of the screw *c*. *d* is the usual measuring-slide, also capable of being moved along the graduated beam *b*. Between the said adjusting and measuring slides is arranged the wedge $f$. This wedge straddles the graduated beam $b$ and is capable of lateral or perpendicular movement thereon. A spring $g$ is provided for holding the respective sides of the slides $a$ and $d$ in contact with the said wedge. The latter may be secured in any position of adjustment by means of a screw $h$, passing through a threaded opening in a bridge-piece $o'$, the latter resting with its ends on the corresponding ends of the spring $g$ and being held in position by the screws which secure the said spring to the slides $a$ and $d$, respectively, Fig. 2.

The adjusting-slide has a mark or indication $o$, preferably provided on a separate plate $k$, secured to the said adjusting-slide by means of screws $m$ passing through longitudinal slots $l$ in the said plate. By shifting the latter the wear of the measuring-surfaces or of the wedge may be compensated for.

The wedge has a graduation $i$, and the latter in the example shown is so arranged that the measuring-slide $d$ has a movement of one millimeter imparted to it when the wedge $f$ is moved relatively to the said mark or indication $o$ from one end of the graduation to the other. Thus, for example, the said wedge may have a pitch of one in thirty millimeters and the graduation may have a length of thirty millimeters. The said graduation has ten division-lines corresponding with each one-tenth millimeter movement of the wedge, and the intermediate space between these division-lines is again subdivided into five parts, so that values of one-fiftieth or one one-hundredth millimeters may be read off with the naked eye.

In order to provide for the attainment of great accuracy with but few division-lines, I may also, as shown in Fig. 3, arrange the plate $k$ with a nonius or vernier and make the graduation on the wedge $f$ somewhat longer, and in such cases where a special degree of accuracy is required I may, in lieu of the adjustment by hand, provide for a mechanical adjustment of the wedge $f$ by means of a screw. It is obvious that in place of a prismatical wedge I may also employ any other conical body; also, that the graduation $i$ may be provided on the plate $k$ and the mark or indication $o$ (or the nonius or vernier) on the wedge $f$.

The improvement above described is very simple and cheap, because the graduation on the wedge $f$ or on the plate $k$ may be made after the wedge is finished and may then be suited to the pitch of the wedge. In this way great accuracy is attainable. The amount of wear is very small and may be readily compensated for by shifting the plate $k$.

A very important advantage of the improvement described consists in that a calipers provided with this improvement may be accurately adjusted with the hand which holds the calipers by simply pressing on the wedge $f$.

When the calipers described are used in shops in which the measuring is usually done from patterns or gages, the calipers are first adjusted for the respective pattern or gage and the wedge $f$ is then drawn back. In order to produce a piece of work corresponding exactly with the said pattern or gage, the said piece is then worked down until in measuring it with the calipers the mark or indication $o$ will exactly coincide with the same division-line of the graduation opposite which it stood when the first adjustment was made.

The improvement above described may also be employed to advantage in gages for measuring inside diameters; also, in measuring-machines and in other similar measuring devices.

Having now described my invention, what I claim as new, and desire to secure by Letters Patent, is—

1. In a measuring device the combination, with an adjusting-slide and a measuring-slide both mounted to be moved along a graduated guiding part, of a wedge arranged between the said slides and capable of being moved transversely to the direction of movement of the said slides so as to move the one slide relatively to the other, and means for reading off the extent of such relative movement, substantially as and for the purpose described.

2. In a measuring device the combination, with an adjusting-slide and a measuring-slide both mounted to be moved along a graduated guiding part, of a wedge arranged between the said slides and capable of being moved transversely to the direction of movement of the said slides so as to move the one slide relatively to the other, a graduation and a mark opposite the same for reading off the extent of such relative movement, substantially as and for the purpose described.

3. In a measuring device the combination, with an adjusting-slide and a measuring-slide both mounted to be moved along a graduated guiding part, of a wedge arranged between the said slides and adapted to be moved transversely to the direction of movement of the said slides so as to move the one slide relatively to the other, a graduation with a nonius or vernier and a mark opposite thereto for reading off the extent of such relative movement, substantially as and for the purpose described.

4. In a measuring device the combination, with an adjusting-slide and a measuring-slide both mounted to be moved along a graduated guiding part, of a wedge arranged between the said slides and adapted to be moved transversely to the direction of movement of the said slides so as to move the one slide relatively to the other, means for reading off the extent of such relative movement, and an adjustable wearing-plate at one side of the said wedge, substantially as and for the purpose described.

5. In a measuring device the combination, with an adjusting-slide and a measuring-slide both mounted to be moved along a graduated guiding part, of a wedge arranged between the said slides and adapted to be moved transversely to the direction of movement of the said slides so as to move the one slide relatively to the other, means for reading off the extent of such relative movement, and a spring for keeping the said slides in contact with the said wedge, substantially as and for the purpose described.

In witness whereof I have hereunto set my hand in presence of two witnesses.

HERMANN KIENAST.

Witnesses:
 H. E. SCHMIDT,
 CHAS. H. DAY.